United States Patent [19]

Gaylord

[11] 3,865,788

[45] Feb. 11, 1975

[54] ORGANOPOLYSILOXANE ELASTOMERS EXHIBITING HIGH ELONGATION

[75] Inventor: Norman G. Gaylord, New Providence, N.J.

[73] Assignee: Dart Industries Inc., Los Angeles, Calif.

[22] Filed: Aug. 20, 1973

[21] Appl. No.: 389,849

[52] U.S. Cl. ...... 260/46.5 G, 260/37 SB, 260/610 R
[51] Int. Cl. ............................................. C08f 11/04
[58] Field of Search ........ 260/46.5 G, 610 R, 37 SB

[56] References Cited
UNITED STATES PATENTS

| | | | |
|---|---|---|---|
| 3,231,542 | 1/1966 | Eisinger et al. | 260/46.5 G |
| 3,234,174 | 2/1966 | Williams | 260/46.5 G |
| 3,640,985 | 2/1972 | Stevens | 260/610 R |
| 3,647,741 | 3/1972 | Hutchinson | 260/46.5 G |

OTHER PUBLICATIONS

Kirk–Othmer, Encyclopedia of Chemical Technology, Vol. 14, 1967, 2nd ed. pp. 814 & 815.

*Primary Examiner*—Melvyn I. Marquis
*Attorney, Agent, or Firm*—Fred S. Valles; Arthur S. Collins; Margareta LeMaire

[57] ABSTRACT

Organopolysiloxane elastomers exhibiting high toughness and high elongation are obtained upon curing with t-butyl-$\beta$-hydroxyethyl peroxide.

5 Claims, No Drawings

ORGANOPOLYSILOXANE ELASTOMERS EXHIBITING HIGH ELONGATION

The present invention relates to organopolysiloxane compositions exhibiting high elongation upon curing. More particularly, this invention relates to organopolysiloxane compositions obtained by curing the polysiloxane with t-butyl-β-hydroxyethyl peroxide.

Silicone elastomers are useful in many applications because of their desirable physical properties. For example, they exhibit relatively uniform properties over a wide temperature range, low surface tension, a high degree of slip or lubricity, excellent release properties, extreme water repellency, excellent electrical properties over a wide range of temperature and frequency, inertness and compatability both physiologically and in electronic applications, chemical inertness and weather resistance.

It is considered highly desirable for silicone elastomers to exhibit a high degree of toughness and elongation; however, most silicone elastomers that are considered as tough materials usually exhibit high tensile strength coupled with low elongation. In general, silicone elastomers heretofore available have been characterized by elongations of from about 50 to about 200 percent. Such elastomers have been prepared by curing organopolysiloxane gums usually employing organic peroxides such as benzoyl peroxide or a dialkyl peroxide such as di-tert-butyl peroxide as curing agents in admixture with carbonaceous or inorganic fillers. These materials are uniformly blended together such as by milling, mixing and the like. Thereafter, the organopolysiloxane composition can be cured at pressures ranging from about 100 to 2,000 psi or more in combination with temperatures ranging from about 100°C to 300°C or higher. Under such conditions, the time required for effecting the desired degree of cure will depend upon such factors as the amount of peroxide curing agent utilized, the nature of the organopolysiloxane, the type and amount of filler and the ultimate application. Subsequently, a post cure treatment is frequently employed in order to eliminate volatile matter carried in with the filler and with the gum and to eliminate residues resulting from the cure reaction. Post curing usually is conducted by heating the cured product at a temperature of about 450°–500°F. for a period of about 24 hours.

The term "toughness" as employed herein in describing organopolysiloxane elastomers is defined as the product of the break strength (psi) and elongation (%) of the elastomer. Since toughness is directly proportional to both the tensile strength and the elongation of the elastomer, it can be seen that toughness has heretofore been imparted to silicone elastomers principally through their high tensile strengths. It is desirable however, in many applications that a tough elastomer be obtained which is characterized principally by its high elongation. Elastomers of this type are especially useful as safety interlayers for safety glass, surgical gloves, and the like.

Accordingly, it is an object of the present invention to provide silicone elastomers characterized by high toughness and exhibiting high elongation.

It is another object of the present invention to provide a process for curing silicone elastomers employing t-butyl-β-hydroxyethyl peroxide as a curing agent.

These as well as other objects are accomplished by the present invention which provides a process for preparing tough silicone elastomers exhibiting high elongation comprising admixing an organopolysiloxane gum composed of recurring siloxane groups represented by the formulae:

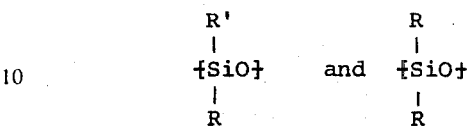

wherein R is a monovalent hydrocarbon group that is free of olefinic unsaturation and R' is a monovalent olefinically unsaturated hydrocarbon group, said organopolysiloxane containing sufficient olefinic unsaturation to enable crosslinking of the gum to produce an elastomer when the gum is cured, with an effective cure initiating amount of t-butyl-β-hydroxyethyl peroxide, and heating the curable gum composition to produce a tough elastomer exhibiting high elongation.

The organopolysiloxane gums useful in the present invention are copolymers that contain recurring siloxane groups represented by the formulae:

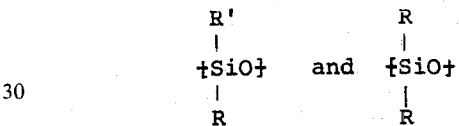

wherein R is a monovalent hydrocarbon group that is free of olefinic unsaturation and R' is a monovalent olefinically unsaturated hydrocarbon group.

Illustrative of the monovalent olefinically unsaturated hydrocarbon groups that are represented by an R' in the above formulae are the alkenyl groups, for example vinyl, allyl and the like; cycloalkenyl groups, for example cyclohexenyl and the like. The preferred monovalent olefinically unsaturated hydrocarbon is the vinyl group.

Illustrative of the monovalent hydrocarbon groups that are free of olefinic unsaturation and that are represented by R in the formulae above are the alkyl groups as, for example, methyl, ethyl, propyl and butyl, the aryl groups as, for example, phenyl and the like; the aralkyl groups as, for example, benzyl, phenyl ethyl and the like and the cycloalkyl groups such as cyclohexyl and the like. Illustrative of useful organopolysiloxane gums are those composed of methyl vinyl siloxy groups and dimethyl siloxy groups; ethyl vinyl siloxy and dimethyl siloxy groups; methyl vinyl siloxy groups, phenyl vinyl siloxy groups and dimethyl siloxy groups; methyl vinyl siloxy groups, dimethyl siloxy groups and diphenyl siloxy groups and the like.

Silicon-bonded monovalent olefinically unsaturated hydrocarbon groups, i.e. groups represented by R' in the formulae above react to produce crosslinks between the molecules of the starting gum through the agency of the t-butyl-β-hydroxy ethyl peroxide curing agent of the present invention. The relative amount of the unsaturated hydrocarbon groups contained in the gum is that amount which provides the degree of crosslinking necessary to impart elastomeric properties to the cured product. Cured products produced from gums that contain an insufficient amount of unsaturation are soft and gummy rather than elastomeric. Cured products produced from gums that contain an excessive amount of unsaturation are hard and brittle rather than elastomeric. Generally, when the amount of siloxane groups containing unsaturated hydrocarbons range from about 0.05 part to about 3.0 parts by weight per hundred parts by weight of the total siloxane groups in the gum sufficient crosslinking can be effected to obtain an elastomeric product.

The specific peroxide curing agent of the present invention, t-butyl 2-hydroxyethyl peroxide, is unique as compared to other conventionally employed peroxides for the curing of silicone elastomers. The peroxide has the following structural formula:

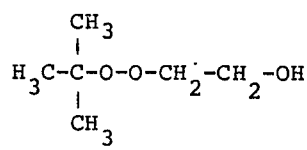

t-Butyl-2-hydroxyethyl peroxide exhibits a half life in xylene at a concentration of 0.2 mole at various temperatures as set forth in the Table below:

| Half Life t-butyl 2-hydroxyethyl peroxide | | |
|---|---|---|
| Temp (°C) | Hours | 10 Hour Half Life Temp. °C |
| 120 | 11.0 | 122 |
| 130 | 4.2 | |
| 140 | 2.0 | | t-Butyl-2-hydroxyethyl peroxide is especially advantageous for use in the present invention in that it does not give rise to halogenated or similar harmful residues thereby making it particularly suitable for medical purposes. Its ease of dispersion in the mix insures pin-hole free rubbers which are especially suitable for gasketing materials and electrical applications. The amount of the peroxide used as a curing agent in this invention is not narrowly critical. The curing agent is usually employed in at least stoichiometric or chemically equivalent amounts, plus when necessary or desirable, a slight excess sufficient to compensate for any volatilization of the curing agent that might occur during curing. Generally, useful amounts of the curing agent can vary from about 0.1 part by weight to about 4 parts by weight of the peroxide per hundred parts by weight of the organopolysiloxane gum. However, it is preferable to use from about 0.5 part by weight to about 1.0 part by weight of the peroxide per 100 parts by weight of the organopolysiloxane gum.

A filler can be added to the composition of the present invention. Fillers that are useful in this invention include acidic fillers such as uncoated finely divided silica, basic fillers such as carbon black and alumina and neutral fillers such as quartz, coated finely divided silica, calcium carbonate and diatamaceous earth. These fillers impart enhanced tensile strength to the silicone elastomers thereby assisting in the development of a tough elastomer.

Various other additives such as structure additives, pigments, heat stabilizers, antioxidants and the like also can be employed.

The organopolysiloxane compositions of the present invention can be prepared by admixing together, such as by milling, dough mixing, Banbury mixing and the like the organopolysiloxane gum, filler, peroxide and other ingredients. The order of addition of the various components is not critical. It is preferred, however, to add the peroxide to the gum along with or after the filler has been added. Thereafter, the organopolysiloxane composition can be cured and molded at pressures of from about 1,000 to 2,000 psi or more, in combination with temperatures ranging from about 100°C to 300°C or higher. A post cure treatment in an air-circulating oven is considered desirable in order to eliminate volatiles and other residues resulting from the cure reaction. Post curing can be conducted by heating the cured products at a temperature of above about 400°F for a period of 24 hours.

The following example further defines, describes and compares the tough organopolysiloxane elastomers of the present invention. Parts and percentages are by weight unless otherwise indicated.

EXAMPLE I

A silicone rubber gum, Silastic 435 Base available from Dow Corning, containing 76 wt.% of a polysiloxane having both methyl and vinyl substituent groups on the polymer chain and 24 wt.% of a reinforcing silica was mixed on a roll mill for 10 minutes at room temperature with Cab-O-Sil MS-7 colloidal silica available from Cabot Corporation (5.6 grams per 80 grams rubber). Thereafter, the gum was admixed with 0.87 gms (5.9 millimoles) t-butyl-2-hydroxyethyl peroxide for 10 minutes. The mixture was cured in a standard rubber mold under 20,000 lbs. ram pressure at 350°F for 10 minutes (7 half lives) after a 5 minute warm-up. The molded slab was then post-cured in an air circulating oven at 480°F for 24 hours.

For comparative purposes 5.9 millimoles of other conventionally employed peroxides were used to cure the silicone rubber under similar conditions and at temperatures where 10 minutes represented 7 half lives. The amounts of peroxide, the cure temperatures, together with the physical properties of the resulting elastomers are shown in the Table below.

MECHANICAL PROPERTIES OF PEROXIDE CURED ORGANOPOLYSILOXANES

| | Peroxide | Peroxide Amount (gms)[1] | Cure Temp(°F) | Cure Time (min)[4] | Break Strength (psi)[5] | Ultimate Elongation (%)[6] | Toughness [7] |
|---|---|---|---|---|---|---|---|
| Example 1 | t-butyl-2-hydroxyethyl peroxide | 0.87 | 350 | 10 | 470 | 740 | 398,000 |
| Comparative Example 1 | di-t-butyl peroxide | 0.856 | 340 | 10 | 680 | 180 | 122,400 |
| do. 2 | 2,5-dimethyl-2,5-di-(t-butylperoxy)hexane | 0.86 | 340 | 10 | 780 | 200 | 156,000 |
| do. 3 | di-tert-amyl peroxide | 1.08 | 340 | 10 | 780 | 230 | 179,500 |

MECHANICAL PROPERTIES OF PEROXIDE CURED ORGANOPOLYSILOXANES — Continued

| | | Peroxide | Peroxide Amount (gms)[1] | Cure Temp(°F) | Cure Time (min)[4] | Break Strength (psi)[5] | Ultimate Elongation (%)[6] | Toughness[7] |
|---|---|---|---|---|---|---|---|---|
| do. | 4 | tert-butyl peroxy isopropyl carbonate | 1.08 | 280 | 10 | 740 | 190 | 140,700 |
| do. | 5 | tert-butyl perisononanoate | 1.37 | 260 | 10 | 660 | 190 | 125,300 |
| do. | 6 | 2,4-dichloro benzoyl peroxide | 1.56[2] | 240[3] | 5 | 440 | 80 | 35,200 |

[1] Gms of peroxide per 80 gms Silastic 435 Base and 5.6 gms. Cab-O-Sil MS-7
[2] Gms of peroxide per 29 gms Silastic 435 Base and 2.03 gms. Cab-O-Sil MS-7
[3] Cure time 5 min. plus 5 min. to reach temperature
[4] In addition to 5 min. to reach mold temp.
[5] ASTM D412
[6] ASTM D412
[7] Product of Break Strength (psi) and Ultimate Elongation (%)

It can be seen from the above that the use of tertiary butyl-2-hydroxyethyl peroxide in the curing of silicone elastomers provides an extremely tough elastomer exhibiting a toughness above 300,000 and significantly higher elongation than silicone elastomers similarly cured using other conventionally employed peroxide curing agents.

Although specific material and conditions are set forth in the above exemplary process for preparing an organopolysiloxane elastomer in accordance with the present invention, these are merely intended as illustrations of the present invention. Various other organopolysiloxane elastomers, fillers, additives and curing conditions such as those listed above may be substituted in the example with similar results.

Other modifications of the present invention will occur to those skilled in the art upon the reading of the present disclosure. These are intended to be included within the scope of this invention.

What is claimed is:

1. A process for preparing heat curable silicone elastomer compositions which after complete curing exhibit excellent toughness and high elongation comprising admixing with an organopolysiloxane gum the organic portion of which is essentially hydrocarbon and 0.05 to 3 percent by weight of the organosiloxane units of which contain olefinic unsaturation from about 0.1 part to about 4 parts by weight of t-butyl-β-hydroxy ethyl peroxide per 100 parts by weight of said organopolysiloxane gum.

2. The process of claim 1 wherein the t-butyl-β-hydroxy ethyl peroxide is admixed in proportions of between about 0.5 and about 1.0 part per 100 parts by weight of said organopolysiloxane gum.

3. The process of claim 1 wherein most of the hydrocarbon groups in said organopolysiloxane gum are methyl groups.

4. The process of claim 1 wherein the olefinic unsaturation in said 0.05 to 3 percent by weight fraction of diorganosiloxane units is mostly in the form of vinyl groups.

5. A process as defined in claim 1 wherein a filler is additionally admixed with the gum and the peroxide.

* * * * *